US012744729B2

(12) United States Patent
Amend et al.

(10) Patent No.: US 12,744,729 B2
(45) Date of Patent: Sep. 22, 2026

(54) METHOD FOR TRAFFIC MATCHING IN TERMINALS WITH UE ROUTE SELECTION POLICY (URSP)

(71) Applicant: Deutsche Telekom AG, Bonn (DE)

(72) Inventors: Markus Amend, Nidda (DE); Nico Bayer, Bad Nauheim (DE)

(73) Assignee: Deutsche Telekom AG, Bonn (DE)

( * ) Notice: Subject to any disclaimer, the term of this patent is extended or adjusted under 35 U.S.C. 154(b) by 269 days.

(21) Appl. No.: 18/567,835

(22) PCT Filed: Jun. 3, 2022

(86) PCT No.: PCT/EP2022/065216
§ 371 (c)(1),
(2) Date: Dec. 7, 2023

(87) PCT Pub. No.: WO2022/258526
PCT Pub. Date: Dec. 15, 2022

(65) Prior Publication Data

US 2024/0267323 A1 Aug. 8, 2024

(30) Foreign Application Priority Data

Jun. 9, 2021 (EP) .................................... 21178615

(51) Int. Cl.
*H04L 45/302* (2022.01)
*H04L 45/00* (2022.01)
*H04W 40/02* (2009.01)

(52) U.S. Cl.
CPC ............ *H04L 45/306* (2013.01); *H04L 45/56* (2013.01); *H04W 40/02* (2013.01)

(58) Field of Classification Search
CPC ...... H04L 45/306; H04L 45/56; H04W 40/02; H04W 88/06

(Continued)

(56) References Cited

U.S. PATENT DOCUMENTS

2020/0053622 A1* 2/2020 Huang-Fu ......... H04W 28/0268
2020/0312510 A1* 10/2020 Snow .................. G11B 5/7368

(Continued)

FOREIGN PATENT DOCUMENTS

EP 3751906 A1 12/2020
WO WO 2020252281 A1 12/2020

OTHER PUBLICATIONS

Nokia et al: "Configuration of URSP for FN RG", 3GPP Draft; S2-2001121, 3rd Generation Partnership Project (3GPP), Mobile Competence Centre, Jan. 17, 2020 (Jan. 17, 2020), pp. 1-6, vol. SA WG2, No. Incheon, Korea; Jan. 13, 2020-Jan. 17, 2020, 650, Route Des Lucioles; F-06921 Sophia-Antipolis Cedex; France, XP051843873, Retrieved from the Internet: URL: https://ftp.3gpp.org/tsg_sa/WG2_Arch/TSGS2_ 136AH_Incheon/Docs/S2-2001121.zip S2-2001121 was S2-2001120 5WWC FN RG URSP 23316V1 SENT.docx [retrieved on Jan. 17, 2020].

(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

A method for selecting a route for outgoing data traffic includes receiving, by a communication terminal, at least one user equipment route selection policy rule, which comprises a traffic descriptor and at least one route selection component. The communication terminal detects a traffic-related information item which is related to at least one outgoing data unit. The communication terminal selects a (Continued)

user equipment route selection policy rule from the at least one received user equipment route selection policy rule, where a traffic descriptor of the selected user equipment route selection policy rule is associated with the detected traffic-related information item on the basis of a matching table that is stored in the communication terminal. The communication terminal selects a route for the at least one outgoing data unit on the basis of a route selection component of the selected user equipment route selection policy rule.

15 Claims, 2 Drawing Sheets

(58) Field of Classification Search
USPC .......................................................... 370/392
See application file for complete search history.

(56) References Cited

U.S. PATENT DOCUMENTS

2020/0359295 A1* 11/2020 Huang-Fu ............. H04W 80/10
2020/0382605 A1 12/2020 Ouyang et al.
2021/0051562 A1 2/2021 Huang-Fu et al.
2021/0235372 A1* 7/2021 Wang .................... H04W 24/02
2021/0344759 A1* 11/2021 Ouyang ................ H04L 45/306
2022/0104117 A1* 3/2022 Xu ........................ H04W 48/18

OTHER PUBLICATIONS

OPPO: “UE Route Selection Policy”, 3GPP Draft; S2-178438 UE Route Selection Policy P-CR 23.503, 3rd Generation Partnership Project (3GPP), Mobile Competence Centre; Nov. 2017 (Nov. 21, 2017), pp. 1-9, vol. SA WG2, No. Reno, Nevada, USA; Nov. 27, 2017-Dec. 1, 2017 21, 650, Route Des Lucioles; F-06921 Sophia-Antipolis Cedex; France, XP051379451, Retrieved from the Internet: URL: http://www.3gpp.org/ftp/tsg%5Fsa/WG2%5FArch/TSGS2%5F124%5FReno/Docs/ [retrieved on Nov. 21, 2017].

3GPP “Policy and charging control framework for the 5G System (5GS)”, Technical Specification Group Services and System Aspects, TS 23.503, Stage 2 (Release 16), Mar. 31, 2021, pp. 1-120, version 16.8.0.

Nichols et al. “Definition of the Differentiated Services 5 Field (DS Field) in the IPV4 and IPV6 Headers”, Network Working Group, Torrent Networking Technologies, EMC Corporation, IETF RFC 2474, Dec. 1998, pp. 1-20.

* cited by examiner

RAN
AMF
PCF
110
201
202
203
310
320
330
APP 1
APP 2
APP 3
APP 4
204
QoS rule 1
212
211
QoS rule 2
213
QCI 1
QCI 8
QoS rule 3
221
QCI 6
URSP 1
222
URSP 2
223
401
323
322
URSP 3
UPF 1 S-NSSAI A
UPF 2 S-NSSAI B
321
402
Prior Art 500
600
TCU
ECU
AVP
510
ECU
Sensor data
520
ECU
OTA Update
530
10.0.0.1:443
DSCP 10
700
10.0.0.1:443 /
NI RT
10 / NI GBR
NA / NI Default
621
622
623
610
Modem
URSP

METHOD FOR TRAFFIC MATCHING IN TERMINALS WITH UE ROUTE SELECTION POLICY (URSP)

CROSS REFERENCE TO RELATED APPLICATIONS

This application is a U.S. National Phase application under 35 U.S.C. § 371 of International Application No. PCT/EP2022/065216, filed on Jun. 3, 2022, and claims benefit to European Patent Application No. EP 21178615.7, filed on Jun. 9, 2021. The International Application was published in English on Dec. 15, 2022 as WO 2022/258526 A1 under PCT Article 21(2).

FIELD

The invention relates to a method for route selection by a communication terminal and to a respectively adapted communication terminal, wherein the communication terminal is adapted for route selection based on user equipment route selection policy (URSP).

BACKGROUND

User Equipment Route Selection Policy (URSP) is a mechanism defined in "Policy and charging control framework for the 5G System (5GS)", 3GPP TS 23.503, version 16.8.0, 2021-03-31, for route selection of traffic and/or services. Mobile network operators (MNOs) operating a 5G core are able to use the Policy Framework of a 5G core, especially the PCF, to provide URSP rules to a terminal, e.g. a cell phone, a vehicle, an Internet of Things (IoT) device, a machine, a smartwatch, or an automated guided vehicle (AGV), wherein the URSP mechanism can be applied during PDU establishment or in a later phase.

A URSP rule defines a rule precedence, a traffic descriptor (TD) and one or more route selection descriptors, wherein a route selection descriptor defines a route selection descriptor precedence and at least one route selection component. The TD helps to identify a specific traffic and/or service while the route selection descriptor specifies the route to take on the transport between user equipment (UE) and local 5G core or home 5G core. According to Table 6.6.2.1-2 and Table 6.6.2.1-3 as given in above-cited 3GPP TS 23.503, the TD might be an IP address or an application identifier such as an application name to identify a specific application on a cellphone. The route selection component for distinguishing the transport path can for example define a network slice, a data network name (DNN) or a protocol data unit (PDU) session.

A method and device for data route selection utilizing URSP rules is also for instance described in EP 3 751 906 A1. From US 2021/0051562 A1, a method for evaluation of UE Route Selection Policy (URSP) rules is known.

The benefit of having URSP standardized is counteracted by a non-clearly defined implementation on user equipment (UE) side, i.e. on the terminal side. The matching of traffic according to URSP rules and the assignment to the right PDU sessions is up to the implementer of the terminal. The implementation needs to utilize the traffic descriptors in the URSP rules, which are set by the Policy Control Function (PCF), i.e. from outside of the terminal.

SUMMARY

In an embodiment, the present disclosure provides a method for selecting a route for outgoing data traffic by a communication terminal, wherein the communication terminal is adapted for route selection based on user equipment route selection policy. The method comprises the steps of: a) receiving, by the communication terminal, at least one user equipment route selection policy rule, which comprises a traffic descriptor and at least one route selection component; b) detecting, by the communication terminal, a traffic-related information item which is related to at least one outgoing data unit; c) selecting, by the communication terminal, a user equipment route selection policy rule from the at least one received user equipment route selection policy rule, wherein a traffic descriptor of the selected user equipment route selection policy rule is associated with the detected traffic-related information item on the basis of a matching table that is stored in the communication terminal; and d) selecting, by the communication terminal, a route for the at least one outgoing data unit on the basis of a route selection component of the selected user equipment route selection policy rule.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In accordance with an embodiment, the present invention shows a way how route selection in a communication terminal, which is adapted for URSP, may be improved.

It is to be noted that the term communication terminal shall refer to a user equipment (UE) as used in above-cited 3GPP TS 23.503, which generally may be any kind of terminal device in a 5G system.

An aspect of the present invention may be seen in introducing the concept of a matching table to provide a solution for terminals to identify services and/or traffic and assign them to a given route provided by URSP through a 5G modem or a non-3GPP path such as Wi-Fi. In a preferred aspect of the invention, the matching table is able to assign traffic and/or services to URSP given routes according to terminal internal identifiers, wherein said terminal internal identifiers may in particular be identifiers, which are not defined in a URSP rule.

Figure 1:
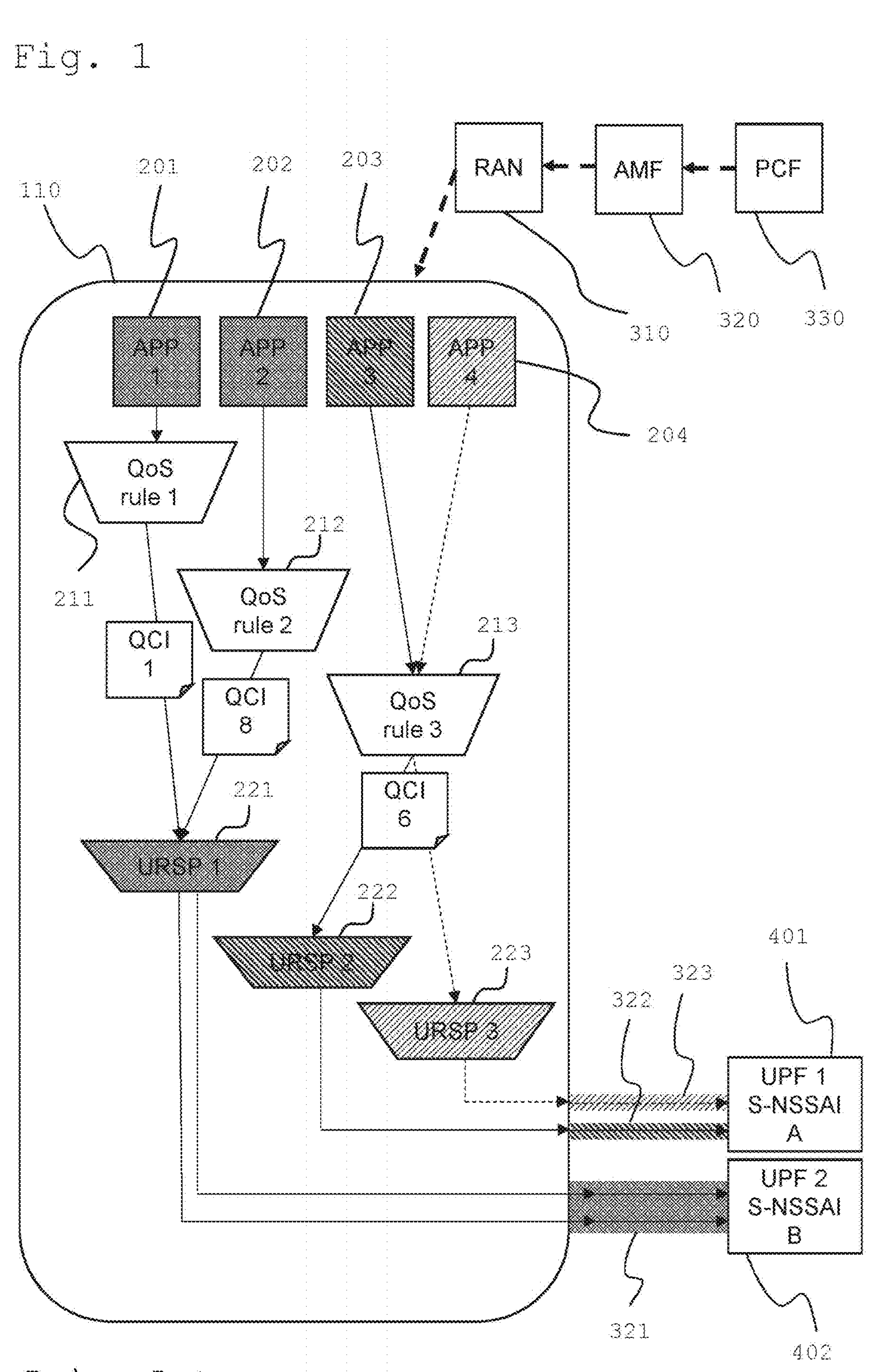
FIG. 1 a schematic view of a terminal showing the separation and prioritization of services amongst each other based on given URSP rules.

In FIG. 1 a schematic view of a terminal 110 is shown, illustrating the separation and prioritization of services amongst each other based on given URSP rules according to prior art. In the shown example, the terminal 110 receives three URSP rules 221, 222 and 223 from the Policy Control Function (PCF) 330 via the Access and Mobility Management Function (AMF) 320 and the radio access network (RAN) 310. An exemplary content of these URSP rules is given in the following table:

| URSP# | Traffic descriptor | Route selection component |
|---|---|---|
| 1 | APPID = "APP1"; APPID = "APP2" | S-NSSAI(s) = "S-NSSAI B" DNN = "UPF 2" |
| 2 | APPID = "APP3" | S-NSSAI(s) = "S-NSSAI A" DNN = "UPF 1" SSC mode = 1 |
| 3 | APPID = "APP4" | S-NSSAI(s) = "S-NSSAI A" DNN = "UPF 1" SSC mode = 1 |

Also provided are three QoS rules 211, 212 and 213, the exemplary content of which is given in the following table:

| QoS rules # | QFI of the associated QoS Flow | Packet Filter Set | Precedence value |
|---|---|---|---|
| 1 | 1 - conversational voice | DST IP: 10.1.1.1 DST port: 1234 | 1 |
| 2 | 8 - www | Default rule | 3 |
| 3 | 6 - video | Protocol ID: RTSP | 2 |

In FIG. 1, it is shown how data traffic originating from the applications 201, 202, 203 and 204 is prioritized and routed. Applying the QoS rules results in respective QoS Class Identifiers (QCI) of the data traffic of the applications. Based on the URSP rules the data traffic is routed to the respective Protocol Data Unit (PDU) session, wherein reference signs 322 and 323 indicate PDU sessions connecting a first User Plane Function (UPF) 401, i.e. UPF 1, and reference sign 321 indicates a PDU session connecting a second UPF 402, i.e. UPF 2.

In the example shown in FIG. 1 application identifiers are used as traffic descriptors in the URSP rules, resulting in a route selection of data traffic originating from the respective applications that is set by the PCF 330 via the URSP rules 221, 222 and 223.

Figures 2, 3:
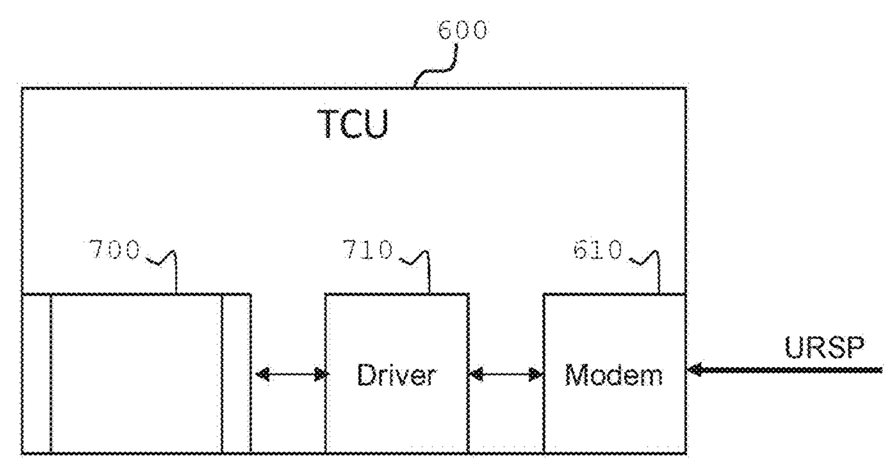
FIG. 2 a schematic view of a vehicle comprising a preferred embodiment of an inventive communication terminal in the form of a telematics control unit.
FIG. 3 a schematic view of a preferred embodiment of the telematics control unit shown in FIG. 2.

In FIG. 2 a schematic view of a vehicle 500 is shown, which comprises a preferred embodiment of an inventive communication terminal in the form of a telematics control unit (TCU) 600, which is adapted for route selection based on URSP. In the following, an inventive communication terminal is also simply referred to as terminal.

With the URSP mechanism, services and traffic can be separated for security or data privacy reasons, for providing adjusted transport capabilities (e.g. low latency, GBR), or for accounting or traffic control purposes.

The invention proposes to establish a matching table 700 in a communication terminal, i.e. in the TCU 600 in the example shown in FIG. 2. The matching table 700 is stored in a memory of the terminal 600 and is preferably used by the operating system of the terminal 600 to provide a respective matching function.

The communication terminal 600 is adapted for route selection based on URSP and comprises a processor, a memory, and a wireless communication interface 610 adapted for 5G based communication. It is noted that the processor and the memory are not shown in the schematic view of FIG. 2.

The communication terminal 600 is adapted for receiving at least one user equipment route selection policy rule, which comprises a first traffic descriptor and at least one route selection component, detecting a traffic-related information item which is related to at least one outgoing data unit, selecting a user equipment route selection policy rule from the at least one received user equipment route selection policy rule, wherein the traffic descriptor of the selected user equipment route selection policy rule is associated with the detected traffic-related information item on the basis of matching table 700 that is stored in the communication terminal 600, and selecting a route for the at least one outgoing data unit on the basis of a route selection component of the selected user equipment route selection policy rule.

Accordingly, an inventive method for selecting a route for outgoing data traffic by the communication terminal comprises the steps of a) receiving, by the communication terminal, at least one URSP rule, which comprises a traffic descriptor and at least one route selection component, b) detecting, by the communication terminal a traffic-related information item which is related to at least one outgoing data unit, c) selecting, by the communication terminal, a URSP rule from the at least one received URSP rule, wherein the traffic descriptor of the selected user equipment route selection policy rule is associated with the detected traffic-related information item on the basis of the matching table 700 that is stored in the communication terminal, d) selecting, by the communication terminal, a route for the at least one outgoing data unit on the basis of a route selection component of the selected user equipment route selection policy rule.

As described in more detail below, the traffic related information item may preferably be a terminal internal identifier, which is not defined in any of the URSP rules. However, any kind of identifier suitable for identifying an outgoing data unit may be used as traffic related information item.

The matching table 700, or rather the matching function provided by means of the matching table 700, is the central decision point to receive on the one hand from the cellular modem 610 URSP rules or the required extracted information thereof and on the other hand to identify traffic and/or services. It is the main task of the matching table 700 or the matching function based thereon, according to the available information, to assign traffic and/or services to the URSP provided route. For this purpose, the matching table 700 preferably comprises at least one entry, each entry associating a traffic-related information item with a corresponding traffic descriptor. It is to be noted that the matching table and the matching function based thereon is established in the terminal, for example in the terminal operation system, and not in the 5G modem 610.

In FIG. 2 the matching table 700 is part of a vehicle communication with a Mobile Network Operator (MNO). A cellular 5G communication path is offered by this MNO to the vehicle, where this communication path is terminated in the cellular 5G modem 610, which in the shown example is part of the Telematics control unit (TCU) 600. An electronic control unit (ECU) provides different applications, for example Drive-by-Wire, Multimedia, Navigation or Automated valet parking (AVP) and is located in the vehicle 500 along with the TCU 600, which provides the required connectivity.

In FIG. 2 exemplary applications 510, 520 and 530 are shown, which are provided by the ECU. Due to the different nature of these applications with a different demand on transport reliability, the MNO offers for example 3GPP defined Network Slices to fulfill the required Quality of Service (QoS). It should be clear, that other separation mechanisms like QoS rules and/or DNN provide similar mechanisms to reach this goal. For a dynamic provisioning of those mechanisms, URSP is used and sent from the MNO towards the TCU 600, respectively the 5G modem 610.

The invention proposes to utilize the newly introduced matching table 700, located in the TCU 600, to make the relation between URSP given rules and services.

While a URSP rule using an IP descriptor as traffic descriptor may be implemented by inspecting the well-specified IP header on OSI Layer 3 and/or transport header on OSI Layer 4, any other traffic descriptor cannot be matched in such a simple way. Especially a traffic descriptor defining an application identifier or a data network name (DNN) may require additional effort to identify the respective services and/or traffic.

For matching services and/or traffic the matching table 700 is proposed, which essentially provides an additional matching level within the terminal 600, thereby extending the functionality of URSP rules.

FIG. 3 shows a schematic view of a preferred embodiment of the TCU 600, in which an interface, e.g. a driver 710, is provided for communicating with the modem 610. Whenever a valid URSP rule is received by the 5G modem 610 in the TCU 600, it is communicated through this interface, e.g. driver 710, to the matching table 700, or rather to the operating system of terminal 600, which provides the matching function based on the matching table 700. In addition, the driver 710 preferably exposes the different routes, given by URSP, as virtual network interfaces 621, 622, 623, as shown in FIG. 2. The use of virtual network interfaces with advantage simplifies the process of route selection, wherein for this purpose the responsible network device for a given URSP rule, e.g. the specific network device IP address or a network device name, is communicated to the matching function, which is based on the matching table 700.

Alternatively, the final route assignment may be exclusively applied in the 5G modem, in which case the matching function informs the 5G modem 610 through an interface, e.g. the driver 710, which traffic and/or service is assigned to a particular PDU session, Network Slice or DNN. For example, the source or destination IP address and/or port from an identified service and/or traffic is communicated from the matching function to the 5G modem 610 along with the related route selector. This process preferably is repeated at least whenever a new service and/or traffic is matched or the matching is outdated.

Again referring to the exemplary embodiment shown in FIG. 2, it is assumed that two network slices are provisioned to the vehicle, wherein the first is intended for real time (RT) services, denoted S-NSSAI: Real-Time, matching any traffic and/or service with a destination IP tuple 10.0.0.1:443. A second network slice is provisioned for services and/or traffic with demand on a guaranteed bit rate (GBR), denoted S-NSSAI: GBR, matching services with AppID "sensor". The 5G modem 610 in the TCU 600, exposing the different routes received by URSP as network devices, takes the aforementioned URSP rules to create three network devices 621, 622 and 623, wherein two of them refer to the specified real-time and GBR network slice and another one, for default, non-matching, traffic and/or services, which are not subject of the URSP rules.

The driver 710 informs the matching function, which is based on matching table 700, about these three network interfaces along with the authorized identifiers, i.e. IP tuple 10.0.0.1:443 and AppID "Sensor", respectively. This enables the matching function to redirect identified traffic to the right network interface.

In case of the first URSP rule, the services and/or traffic can be identified by the IP tuple, thus not requiring further mechanisms. In the shown example, the AVP service 510 may communicate with the destination IP address 10.0.0.1 and port 443, which is detected by the matching function and traffic is directed through the network interface (NI) connected with the "Real-Time" (RT) Network Slice.

Services and/or traffic, which shall be transmitted through the "GBR" network slice shall, according to the URSP rule, be identified by the AppID "sensor". It is, however, not part of the 3GPP URSP specification how to implement this.

The method for route selection preferably comprises an enhanced matching based on an internal identifier or identifiers, wherein said internal identifier is used as the traffic-related information item as defined above in step b) of the method. In the shown example, as an internal identifier a Differentiated Services Code Point (DSCP) is used, which is defined as part of the IP header in "Definition of the Differentiated Services Field (DS Field) in the IPv4 and IPv6 Headers", Fred Baker and David L. Black and Kathleen Nichols and Steven L. Blake, IETF RFC 2474, December 1998. In the shown example, the matching table assigns DSCP value 10 to the GBR network slice, wherein data traffic with DSCP value 10 is provided by application 520. The entries in the matching table 700 may be statically defined in the terminal operating system or may be dynamically updated by user input provided via a user interface of the communication terminal, by an application executed by the communication terminal, or by a separate device communicatively connected with the communication terminal. In a preferred embodiment, the entries of the matching table 700 may be dynamically assigned by mechanisms like Subscriber Identity Module (SIM) profile or embedded SIM (eSIM) profile, Representational State Transfer (REST), Entitlement, or by other mechanisms. In particular, the entries may be updated by an INO using an entitlement server, wherein an entitlement server is a set of specifications to allow mobile operators to enable and disable services and features on end-user devices.

Alternatively to DSCP, other internal identifiers may be used and accordingly may be defined in an entry of the matching table 700, such as a virtual local area network identifier (VLAN ID) as defined for example in "IEEE Standard for Local and metropolitan area networks—Bridges and Bridged Networks" in IEEE Standard 802.1Q-2014 (Revision of IEEE Std 802.1Q-2011), vol., no., pp. 1-1832, 19 Dec. 2014, doi: 10.1109/IEEESTD.2014.6991462. Other alternatives may be socket options, e.g. set by POSIX defined setsocketopt( ), firewall marks or a unique app identifier, e.g. given by an app store like a name or a unique number.

The advantage of using an identifier such as DSCP or VLAN ID is their availability in any Ethernet frame or IP packet sent by a service. This allows a continuous matching of services against URSP rules without any interruption. That means any change in URSP matching through changed URSP rules or the internal identifier such as DSCP has an immediate effect, and no information is mismatched.

It is to be noted that such a continuous identifier, which is present in any information sent out by the respective service, can also be located in other areas of the Ethernet frame or IP header or in headers of higher layers such as the TCP header.

Any data traffic, which cannot be identified according to a given URSP rule, since the traffic-related information items defined in the entries of the matching table 700 prior to the last entry are not available (NA), is forwarded by the matching function on the basis of the matching table 700 to the default network interface (NI Default), as defined in the last entry of the exemplary matching table 700 shown in FIG. 2. It is to be noted that the 5G modem 610 might also create a network interface for default data traffic based on a respective default URSP rule.

It is to be noted that any feature described above in the context of an inventive communication terminal that is arranged in a vehicle, may also be applied to any other terminal such as a cell phone, a vehicle, an IoT device, a machine, a smartwatch, or an AGV.

At least some of the preferred aspects of the invention are summarized below.

According to one aspect, a method for selecting a route for outgoing data traffic by a communication terminal is provided, wherein said communication terminal is adapted for route selection based on URSP, comprising the steps of a) receiving, by the communication terminal, at least one URSP rule, which comprises a traffic descriptor and at least one route selection component, b) detecting, by the communication terminal a traffic-related information item which is related to at least one outgoing data unit, c) selecting, by the communication terminal, a URSP rule from the at least one received URSP rule, wherein the traffic descriptor of the selected user equipment route selection policy rule is associated with the detected traffic-related information item on the basis of a matching table 700 that is stored in the communication terminal, d) selecting, by the communication terminal, a route for the at least one outgoing data unit on the basis of a route selection component of the selected user equipment route selection policy rule.

The communication terminal preferably may be the above described telematics control unit 600, comprising the matching table 700. But generally, the communication terminal may be any terminal capable of wireless communication on the basis of the 5G standard, such as for example a cell phone, an IoT device, a machine, a smartwatch, or an automated guided vehicle.

Step c) may preferably be performed by the operating system of the communication terminal, wherein for this purpose the matching table preferably is integrated in or accessed by the operating system. The matching table may for example be stored in a non-volatile memory of the communication terminal, wherein for access purposes all or parts of the information comprised in the matching table may be transferred into a volatile memory of the communication terminal, e.g. on power-up of the communication terminal.

In a preferred embodiment, the matching table, as for example matching table 700 as described above, may be dynamically updated by user input provided via a user interface of the communication terminal, by an application executed by the communication terminal, or by a separate device communicatively connected with the communication terminal. In particular, an update may be initiated by an Internet server or by a server located in the 5G core network.

The matching table preferably comprises at least one entry, wherein each entry associates a traffic-related information item with a corresponding traffic descriptor. Updating the matching table may comprise adding a new entry, deleting an entry and/or changing the information of an entry.

In a preferred embodiment of the method, the traffic-related information item, which is detected in step b), is comprised in a header of a data unit of outgoing data traffic, and in particular is a differentiated service code point (DSCP) or a virtual local area network identifier (VLAN ID).

The at least one outgoing data unit may also be associated with a communication service, wherein the route which is selected in step d) may be used for all outgoing data traffic of said communication service. In such an embodiment, route selection based on the matching table 700 may be performed only once for the respective communication service.

Typically, the selected route is defined by a protocol data unit session, a network slice, or a data network name, wherein this definition is comprised in a route selection component of the respective URSP rule In a preferred embodiment of the method, the communication terminal comprises a 5G capable modem 610, which receives the at least one user equipment route selection policy rule and which provides access to respective routes via virtual network interfaces 621, 622, 623.

According to another aspect, a communication terminal 600 is provided, adapted for route selection based on user equipment route selection policy, comprising a processor, a memory, and a wireless communication interface 610 adapted for 5G based communication, wherein the communication terminal 600 is adapted for receiving at least one user equipment route selection policy rule, which comprises a traffic descriptor and at least one route selection component, detecting a traffic-related information item which is related to at least one outgoing data unit, selecting a user equipment route selection policy rule from the at least one received user equipment route selection policy rule, wherein the traffic descriptor of the selected user equipment route selection policy rule is associated with the detected traffic-related information item on the basis of a matching table 700 that is stored in the communication terminal 600, and selecting a route for the at least one outgoing data unit on the basis of a route selection component of the selected user equipment route selection policy rule.

In preferred embodiments, the communication terminal may be a telematics control unit 600 of a vehicle 500, a cell phone, an IoT device, a machine, a smartwatch, or an automated guided vehicle (AGV). However, the invention may be generally be employed in any suitable terminal device.

Preferably, the communication terminal further comprises a wireless communication interface adapted for wireless local area (WLAN) communication, wherein the communication terminal is adapted for selecting WLAN communication as a route for the at least one outgoing data unit on the basis of a route selection component of the selected user equipment route selection policy rule. Thereby, for example traffic off-loading is enabled, wherein traffic is intentionally off-loaded In a preferred embodiment, the communication terminal comprises a 5G modem 610 adapted to provide access to routes via virtual network interfaces 621, 622, 623.

For detecting the traffic-related information item in step b) of the above-described method, the communication terminal preferably is adapted to detect an information comprised in a header of a data unit of outgoing data traffic as the traffic-related information item, in particular a differentiated service code point or a virtual local area network identifier.

According to another aspect, a computer program is provided, comprising instructions to cause the above described communication terminal to execute the steps of the above-described method for rote selection. According to a further aspect, a computer-readable medium is provided, having stored thereon said computer program.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

The invention claimed is:

1. A method for selecting a route for outgoing data traffic, comprising the steps of:

a) receiving, by a communication terminal, at least one user equipment route selection policy rule comprising a traffic descriptor and at least one route selection component;

b) detecting, by the communication terminal, a traffic-related information item which is related to at least one outgoing data unit;

c) selecting, by the communication terminal, a user equipment route selection policy rule from the at least one received user equipment route selection policy rule, wherein selecting the user equipment route selection policy rule comprises matching a traffic descriptor of the selected user equipment route selection policy rule with the detected traffic-related information item using a matching table that is stored in the communication terminal, wherein the matching table comprises a plurality of entries, wherein each entry of the plurality of entries of the matching table associates a respective traffic-related information item with a respective corresponding traffic descriptor of a respective user equipment route selection policy rule; and d) selecting, by the communication terminal, a route for the at least one outgoing data unit on the basis of a route selection component of the selected user equipment route selection policy rule.

2. The method of claim 1, wherein step c) is performed by an operating system of the communication terminal, wherein the operating system accesses the matching table.

3. The method of claim 1, wherein the matching table is dynamically updated by user input provided via a user interface of the communication terminal, by an application executed by the communication terminal, or by a separate device communicatively connected with the communication terminal.

4. The method of claim 1, wherein the at least one outgoing data unit is associated with a communication service, and the route which is selected in step d) is used for all outgoing data traffic of the communication service.

5. The method of claim 1, wherein the selected route is defined by a protocol data unit session, a network slice, or a data network name.

6. The method of claim 1, wherein the communication terminal comprises a 5G capable modem which receives the at least one user equipment route selection policy rule and which provides access to respective routes via virtual network interfaces.

7. The method of claim 1, wherein the traffic-related information item, which is detected in step b), is comprised in a header of a data unit of outgoing data traffic.

8. The method of claim 7, wherein the traffic-related information item, which is detected in step b), is a differentiated service code point or a virtual local area network identifier.

9. A communication terminal, adapted for route selection based on user equipment route selection policy, the communication terminal comprises:

a processor;

a memory having processor-executable instructions stored thereon; and a wireless communication interface adapted for 5G based communication;

wherein the processor is configured to execute the processor-executable instructions to facilitate performance of the following by the communication terminal:

receiving at least one user equipment route selection policy rule comprising a traffic descriptor and at least one route selection component;

detecting a traffic-related information item which is related to at least one outgoing data unit, selecting a user equipment route selection policy rule from the at least one received user equipment route selection policy rule, wherein selecting the user equipment route selection policy rule comprises matching a traffic descriptor of the selected user equipment route selection policy rule with the detected traffic-related information item using a matching table that is stored in the communication terminal, wherein the matching table comprises a plurality of entries, wherein each entry of the plurality of entries of the matching table associates a respective traffic-related information item with a respective corresponding traffic descriptor of a respective user equipment route selection policy rule; and selecting a route for the at least one outgoing data unit on the basis of a route selection component of the selected user equipment route selection policy rule.

10. The communication terminal of claim 9, wherein the communication terminal comprises:

a telematics control unit of a vehicle, a cell phone, an Internet-of-Things (IoT) device, a machine, a smartwatch, or an automated guided vehicle.

11. The communication terminal of claim 9, further comprising:

a wireless communication interface adapted for wireless local area network (WLAN) communication;

wherein selecting the route for the at least one outgoing data unit comprises selecting WLAN communication as the route for the at least one outgoing data unit.

12. The communication terminal of claim 9, wherein the wireless communication interface adapted for 5G based communication comprises a 5G modem adapted to provide access to routes via virtual network interfaces.

13. The communication terminal of claim 9, the traffic-related information item is comprised in a header of a data unit of outgoing data traffic.

14. The communication terminal of claim 13, wherein the traffic-related information item is a differentiated service code point or a virtual local area network identifier.

15. A non-transitory computer-readable medium having processor-executable instructions stored thereon for selecting a route for outgoing data traffic, wherein the processor-executable instructions, when executed, facilitate performance of the following steps:

a) receiving, by a communication terminal, at least one user equipment route selection policy rule comprising a traffic descriptor and at least one route selection component;

b) detecting, by the communication terminal, a traffic-related information item which is related to at least one outgoing data unit;

c) selecting, by the communication terminal, a user equipment route selection policy rule from the at least one received user equipment route selection policy rule, wherein selecting the user equipment route selection policy rule comprises matching a traffic descriptor of the selected user equipment route selection policy rule with the detected traffic-related information item using a matching table that is stored in the communication terminal, wherein the matching table comprises a plurality of entries, wherein each entry of the plurality of entries of the matching table associates a respective traffic-related information item with a respective corresponding traffic descriptor of a respective user equipment route selection policy rule; and d) selecting, by the communication terminal, a route for the at least one outgoing data unit on the basis of a route selection component of the selected user equipment route selection policy rule.

* * * * *